(12) United States Patent
Schneider (10) Patent No.: US 6,220,477 B1
(45) Date of Patent: Apr. 24, 2001

(54) FLIP-HANDLE COOKWARE (76) Inventor: Mark H. Schneider, 729 Cleveland Rd. West, Apt. K, Huron, OH (US) 44839

( * ) Notice: Subject to any disclaimer, the term of this patent is extended or adjusted under 35 U.S.C. 154(b) by 0 days.

(21) Appl. No.: 09/453,184

(22) Filed: Dec. 2, 1999

(51) Int. Cl.$^7$ .................................................. B65D 25/28
(52) U.S. Cl. ........................... 220/763; 220/764; 220/757
(58) Field of Search ..................................... 220/762, 764, 220/763, 753, 573.1, 757, 756

(56) References Cited

U.S. PATENT DOCUMENTS

| | | |
|---|---|---|
| 180,766 | 8/1876 | Housum . |
| 1,067,168 | * 7/1913 | Ekvall . |
| 1,480,356 | * 1/1924 | Wegener et al. . |
| 2,403,191 | * 7/1946 | Phillips . |
| 2,444,447 | 7/1948 | Josselyn ................................. 220/94 |
| 2,460,840 | 2/1949 | Mockabee ............................. 16/110 |
| 2,881,945 | * 4/1959 | Rappaport . |
| 2,915,001 | * 12/1959 | Montgomery . |
| 3,082,473 | * 3/1963 | West . |
| 3,812,997 | 5/1974 | McNally ................................ 220/22 |
| 4,505,390 | 3/1985 | Kirk ..................................... 206/547 |
| 4,724,576 | 2/1988 | Tatematsu .............................. 16/110 |
| 5,660,300 | 8/1997 | Demetrio ............................. 220/763 |
| 6,079,590 | * 6/2000 | Munari ................................. 220/762 |

FOREIGN PATENT DOCUMENTS

881176 * 11/1961 (GB) .

* cited by examiner

Primary Examiner—Stephen Castellano
(74) Attorney, Agent, or Firm—Renner, Kenner, Greive, Bobak, Taylor & Weber (57) ABSTRACT

A flip-handle (20) for cookware including a mounting bracket (30, 130) attached to one side of the cookware, a handle (35, 135) vertically rotatably mounted to the mounting bracket (30, 130), and a locking assembly (65, 165) selectively engaging the handle (35, 135) and the mounting bracket (30, 130) to prevent rotation of the handle (35, 135) with respect to the mounting bracket (30, 130). Whereby, the handle (35, 135) may be selectively rotated between and locked in at least substantially horizontal and vertical positions.

21 Claims, 5 Drawing Sheets

FLIP-HANDLE COOKWARE

TECHNICAL FIELD

The present invention generally relates to a cookware handle. More particularly, the present invention relates to a lockable, rotating handle. Most particularly, the present invention relates to a flip-up handle that may be locked in a plurality of selected positions during cooking.

BACKGROUND ART

Cookware generally includes a cooking container that is shaped to hold food over a heat source. The cooking container comes in a variety of shapes and sizes, which are often classified by their function. Focusing, for a moment, on pots and pans, pots generally refer to relatively high-walled cookware, with deep internal cavities, and pans generally refer to relatively low-walled, shallow cavity cookware. Pots and pans may be further classified by their use and include saucepans, frying pans, stockpots, broilers, double boilers, strainers, and woks.

Cookware generally comprises two parts—the cooking container and the handle. To efficiently transfer heat from the heat source to the food, the cooking container is normally constructed of a highly conductive material. As a consequence of its conductivity, this material is equally effective in conducting heat to the user's body if it is brought into contact therewith. To avoid burns and allow the user to manipulate the cookware while cooking, cookware generally uses handles made of less heat-conductive or insulating materials or of sufficient dimension to prevent excessive heat from reaching the user. At times, these handles may interfere with efficient storage of the cookware.

To that end, attempts have been made to address the problem of storage. Known pots that attempt to improve storability have employed handles that rotate horizontally or vertically to occupy less space. In some designs, the handle rotates to a position that places the handle over the mouth of the pot. Alternatively, known storable designs fold the handle against the pot's sidewall, or use a handle configured to wrap around the sidewall and base of the pot, hereinafter referred to as a fold-under design. In general, all of the above designs improve storability by moving the handle in close relationship with the container, such that, the container and handle occupy less space.

While improving the storability of the cookware, the folding handle feature of these designs may provide cookware which is at least somewhat impractical when cooking. In the fold-under designs, the handle may prevent the pot from sitting flat on the cooking surface and therefore may prevent even heat distribution to the cooking surface. The fold-over handle interferes with the manipulation of food within the pot, e.g., stirring, and obstructs the user's view of the cookware's contents. If an attempt were made to manipulate the handle during cooking, the folded or storable position of the previously mentioned designs places the handle in contact or in close proximity to the cooking surface. As a consequence, manipulating the handle to and from the folded configuration, while cooking with these prior art devices, increases the risk of burns. By placing the handle close to the cooking surface, and thus the heat source, the user could easily burn himself or herself while attempting to manipulate the handle.

Although not recognized by these patents, it is desirable to change the handle's position while cooking. When cookware is placed on burners or counter tops, the handle often extends into the pathway of passersby. So situated, the handle may be bumped or snagged on clothing; interfering with the movement of the passerby or causing the cookware to overturn. In the most serious of circumstances, the handle's interference may result in the pot toppling from the stove top, causing its heated contents to be deposited on the passerby. Another concern arises from small children being attracted to the exposed handle that extends beyond the counter or cook top. As a result, children may attempt to grasp the handle bringing the cookware and its contents down upon them. Less seriously, when more than one pot is present on the stove, their handles may interfere with each other. Further, when washing cookware, a conventional projecting handle may prevent the cookware from lying flat against the bottom or otherwise fitting within the sink so that it is immersed in the wash water.

Therefore, a need exists for a handle that can rotate out of the way during cooking and washing. Since it is to be used while cooking, the handle should place the user's hand away from the cooking surface, even when in the folded position. In this way, the user may actuate the handle without burning himself or herself. A further need exists for a handle that folds out of the reach of children or into a position where the handle will not overhang the cook top or counter top. A further need exists for a handle that locks into a plurality of positions, placing the handle out of the way or out of reach while providing for manipulation of the cookware.

DISCLOSURE OF THE INVENTION

Therefore, an object of the present invention is to provide a flip-up handle for cookware that can be pivotally raised and lowered during cooking and washing.

Another object of the present invention is to provide a flip-up handle that greatly facilitates immersing cookware into wash water into a sink or other washing vessels.

Another object of the present invention is to provide a flip-up handle that may be pivotally raised and locked into a vertical position such that small children cannot see or reach the handle.

A further object of the invention is to provide a flip-up handle that may be raised and locked into a position that prevents that handle from invading walkways adjacent to a stove or other cooking surface.

Another object of the present invention to provide a flip-up handle that may be selectively locked into a plurality of positions while providing a means to manipulate the cookware.

Another object of the present invention is to provide a flip-up handle that may be raised and locked into a plurality of positions such that the handle may be locked into a position that reduces handle-to-handle interference between pieces of cookware located on a stove or other cooking surface.

A further object of the present invention is to provide a flip-up handle that can be articulated without placing the user's hand near the surface of the cookware.

Another object of the present invention is to provide a flip-up handle which includes a locking mechanism that may be controlled by the user of the cookware while cooking.

A further object of the present invention is to provide a flip-up handle that includes an actuator for engaging and disengaging the locking mechanism located on the handle allowing the user to lock and unlock the handle and articulate it to a plurality of locked positions while cooking.

The foregoing and other objects of the present invention, which shall become apparent as the detailed description proceeds are achieved by a flip-up handle for cookware having a mounting bracket attached to one side of the cookware, a handle vertically rotatably mounted to the mounting bracket and a locking assembly selectively engaging the handle and the mounting bracket to prevent rotation of the handle with respect to the mounting bracket, whereby the handle may be selectively rotated between and locked in at least substantially horizontal and vertical positions.

PREFERRED EMBODIMENT FOR CARRYING OUT THE INVENTION

Figure 1:
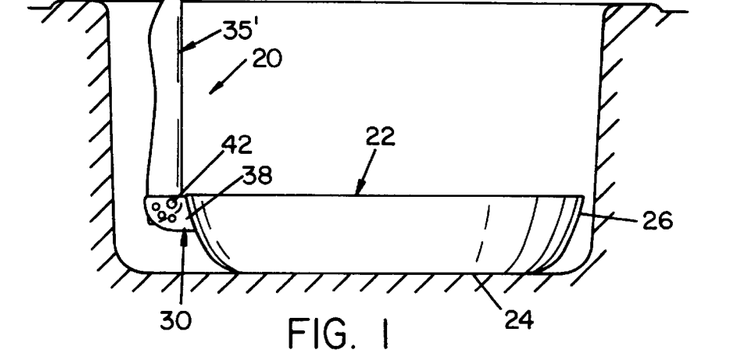
FIG. 1 is a side elevational view of a flip-up handle assembly according to the present invention attached to a piece of cookware showing the combined cookware and handle situated within a sink in the solid line position.

A flip-up handle assembly according to the concepts of the present invention is generally referred to by the numeral 20 in the accompanying drawings. Handle assembly 20 may be attached to a variety of cookware, including, but not limited to, pots, pans, ladles, and woks. A representative pan 22 is shown in FIG. 1. Pan 22 includes a bottom 24 and a sidewall 26 extending upwardly from the bottom 24. Sidewall 26 and floor 24 are generally integrally formed to provide a continuous inner cooking surface 28. To provide uniform and efficient heat transfer, the sidewall 26 and bottom 24 are typically made of highly conductive materials, such as metals and ceramics.

Figure 2:
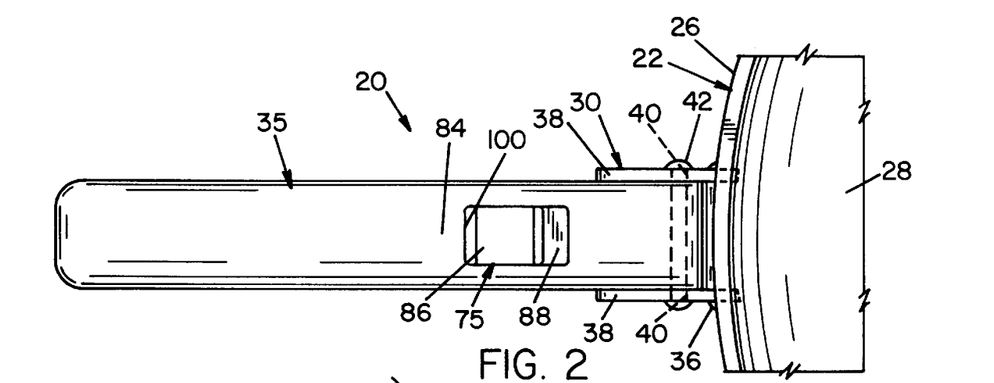
FIG. 2 is a top plan view of the handle assembly of FIG. 1 shown in conjunction with a fragmentary portion of the piece of cookware.
Figure 3:
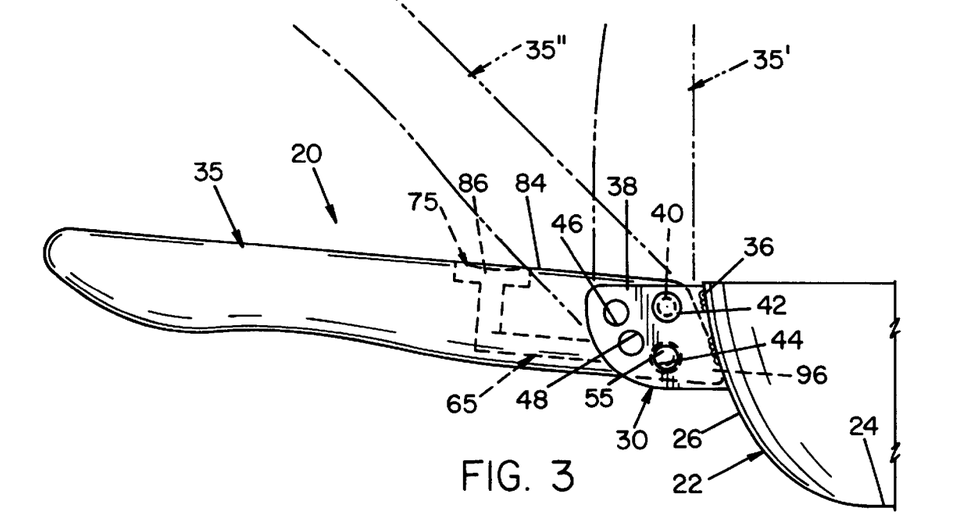
FIG. 3 is a side elevational view of the handle assembly of FIG. 1 attached to the cookware and showing two additional locked positions of the handle in chain lines.

Handle assembly 20 is mounted on the exterior of pan 22, and preferably is attached to sidewall 26. As best shown in FIG. 2, the handle assembly 20 generally includes a mounting bracket 30 and a handle 35 rotatably mounted on mounting bracket 30. Mounting bracket 30 may be conventionally attached to sidewall 26 by fasteners or by welds 36 as shown. Referring to FIG. 2, the mounting bracket 30 may include two spaced, generally vertical arm members 38. Referring to FIG. 3, each arm member 38 is provided with a pivot hole 40 for receiving a pin 42 to which the handle 35 may be rotatably mounted. As shown, pin 42 passes through handle 35, allowing the handle 35 to rotate about pin 42. Other known methods of rotatably mounting handle 35 relative to the arm members 38 may be used. Arm members 38 further define a plurality of lock holes 44, 46, 48 spaced radially outwardly and substantially equidistant from the pivot hole 40. Lock holes 44, 46, 48 receive a locking member to hold the handle 35 in different positions, as will be described more fully below. Any number of arm positions may be implemented by providing sufficient holes for locking handle 35 in each position. The number of holes formed within arm members 38 may be a function of the size of each hole and the locking member characteristics.

Figure 4:
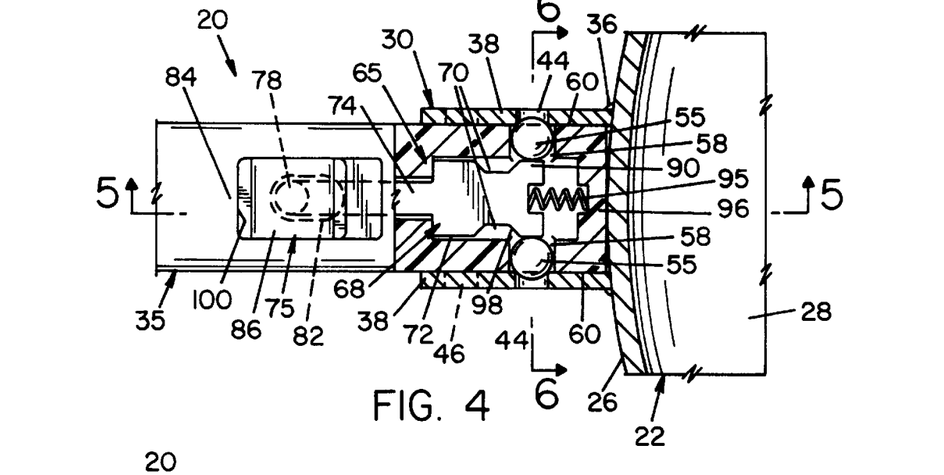
FIG. 4 is a fragmentary top plan view, partially in section, of the cookware handle assembly of FIG. 1 which shows a handle-locking mechanism in the locked position.

In one embodiment of the present invention, shown in FIG. 4, the locking assembly 65 includes a pair of spherical locking members 55 housed within projection holes 58 formed within the sides 60 of handle 35. As one of ordinary skill would appreciate, locking member 55 may be of any size, shape, or material suitable for preventing rotation of the handle 35 during ordinary operating circumstances. Projection holes 58 may be accordingly shaped to receive various locking members 55. As shown, projection holes 58 provide clearance for locking members 55 and are axially aligned with lock holes 44, 46, 48 such that when in a locked position (FIG. 4), the locking members 55 extend outwardly from projection holes 58 and at least partially extend into lock holes 44, 46, 48. In this way, locking members 55 selectively lock the handle into various positions, as defined by the mounting bracket 30.

As shown in FIG. 3, mounting bracket 30 may have three lock holes 44, 46, 48 in each arm member 38 including a first hole 44 located radially outwardly from pivot hole 40 at a lower portion of each of the arm members 38. The first hole 44 is generally vertically aligned below pivot hole 40. When handle 35 is positioned such that locking members 55 engage first hole 44, the handle 35 is in a generally horizontal position. A second lock hole 46 may be located radially outwardly from pivot hole 40 and substantially horizontally aligned therewith. When locking members 55 engage lock hole 46, handle 35 attains a generally vertical upstanding position 35' as shown in chain lines in FIG. 3. As shown in FIG. 1, the upstanding handle position 35' allows the cookware to more easily fit within confined spaces only slightly larger than the cookware, such as a drawer, dishwasher, or sink.

Intermediate holes 48 may be provided along a curved path between first and second lock holes 44, 46 to provide intermediate locked handle positions. Preferably, lock holes 44, 46, 48 are radially equidistant from pivot hole 40 and define a circular arc pathway that coincides with the pathway of the locking members 55 as they pivot about pin 42. In this manner, a plurality of intermediate locking positions may be developed along the circular path.

For example, as shown in FIG. 3, one intermediate position of handle 35, such as 35" depicted in FIG. 3 may be defined by a center lock hole 48 positioned between first and second holes 44 and 46 and spaced radially outwardly from pivot hole 40. Preferably, center lock hole 48 would be spaced at the same radial distance that first and second holes 44 and 46 are spaced from pivot hole 40.

When handle 35 is actuated between first and second holes 44 and 46 and locked into the center lock hole 48, the handle 35 is raised at an approximately 45-degree angle. This position may be useful for providing clearance for other cookware located on the stove top, or may be sufficient to move the handle out of the view and reach of children. Beneficially, this central position 35" allows the cook to manipulate the cookware in relatively the same fashion as when the handle is in a horizontal position.

Figure 5:
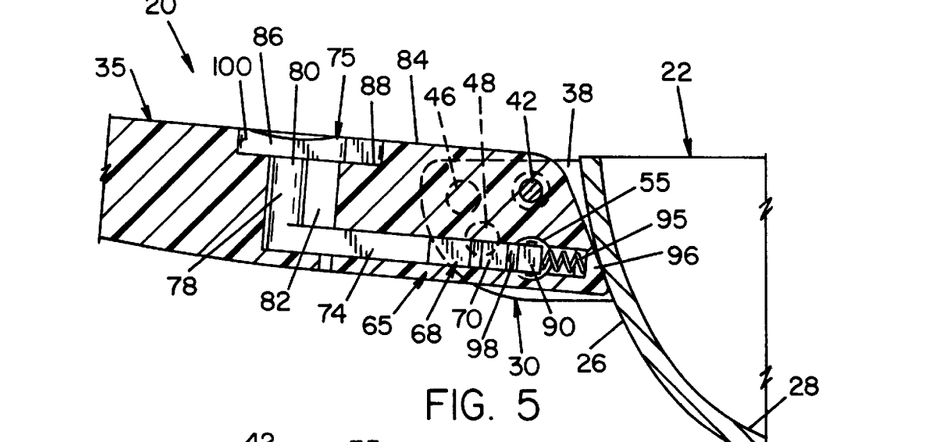
FIG. 5 is a fragmental vertical sectional side view of the handle assembly taken substantially along line 5—5 of FIG. 4 showing details of the handle locking mechanism embodiment.
Figure 6:
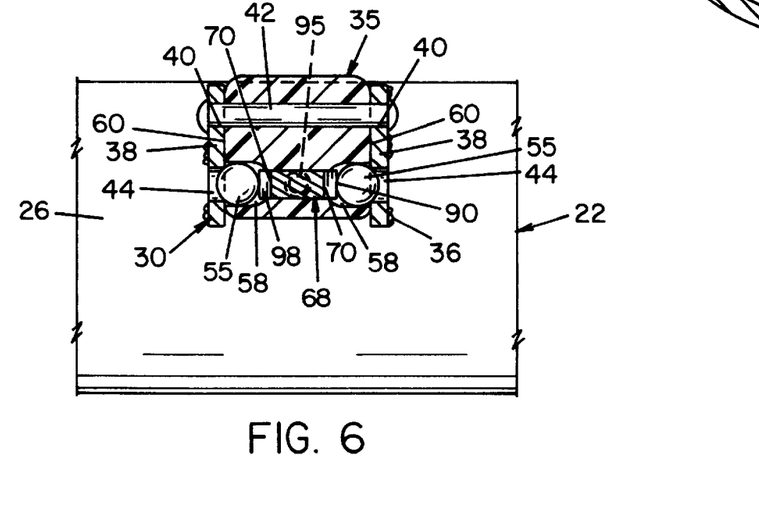
FIG. 6 is a fragmentary vertical sectional view of the handle assembly taken substantially along line 6—6 of FIG. 4.
Figure 7:
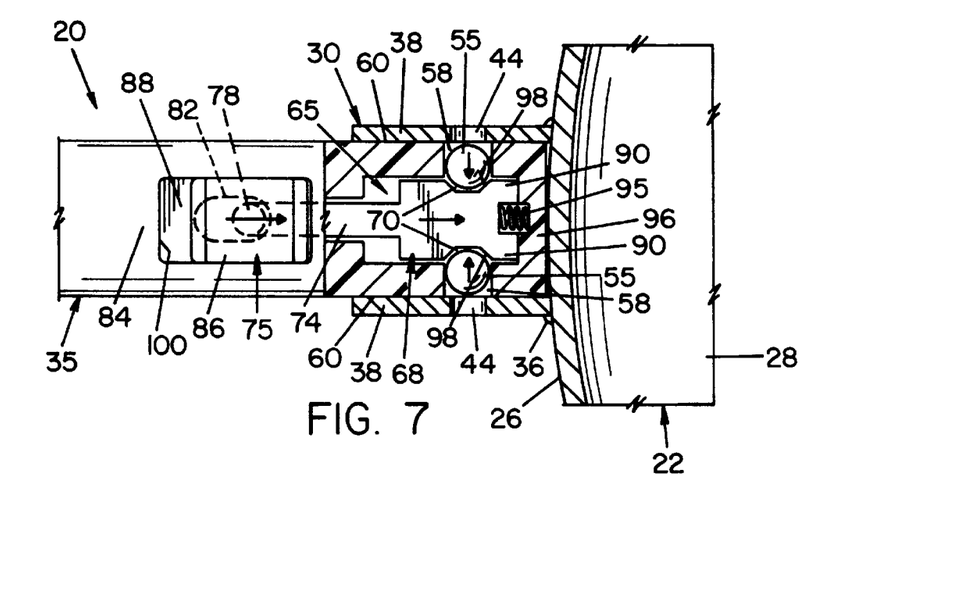
FIG. 7 is a fragmentary top plan view of the handle similar to FIG. 4 and showing the locking mechanism in the unlocked position.

Moving the handle 35 and locking it into position may be accomplished by a variety of known locking mechanisms, including a simple spring-loaded locking member that can be manually depressed within lock holes 44, 46, 48 to allow rotation of handle 35. Or a solid locking pin may be passed through the lock holes and the handle 35 to prevent the handle 35 from moving and removed to allow rotation. One locking assembly is shown in FIG. 4. In this locking assembly indicated generally by numeral 65, a pair of locking members 55 are housed within the sidewalls 60 of handle 35. Sidewalls 60 are provided with suitable openings or projection holes 58, to permit inward and outward displacement of the locking members 55. To cause displacement, locking members 55 may be actuated by a cam 68. Cam 68 may generally be a thin L-shaped member having a pair of recesses 70 formed in the cam sides 72 for at least partially receiving the locking members 55. When the recesses 70 are aligned with locking members 55, the locking members 55 retract or are at least free to partially move into recesses 70 (FIG. 7). The locking movement will be described more fully below. Cam 68 may be fastened to or have an elongated tab 74 extending rearwardly therefrom. Tab 74 spaces the user's hand from the cook surface, placing the lock-actuating mechanism 75 away from the handle's point of attachment. As shown in FIG. 5, tab 74 may be provided with a vertical member 78 that extends upwardly and terminates in a distal end 80 that resides in a slider hole 82 formed within the top surface 84 of handle 35. As should be recognized by one of ordinary skill in the art, the tab 74 and vertical member 78 may be combined into a single elongated member that angles upwardly to slider hole 82. Slider hole 82 may be used to limit the movement of distal end 80 and, thus, limit the movement of cam 68. As shown, slider hole 82 is an elongated aperture that essentially limits longitudinal motion of cam 68. The length of slider hole 82 is sufficient for cam 68 to move from locked (FIG. 4) to unlocked (FIG. 7) positions. Distal end 80 may be provided with a slider or selector switch 86, and the upper surface 84 of handle 35 may be provided with a depression 88 to accommodate this slider 86. The depression 88 may be sized to restrict cam movement in a similar manner to slider hole 82.

As best shown in FIG. 7, the forward motion of slider 86 is transferred through the vertical member 78 and tab 74 to cam 68 advancing the cam 68. As the cam 68 advances, depicted by the arrow, the locking members 55 are permitted to displace inwardly into recesses 70. This inward motion of locking members 55 is motivated by the external force of the arm members 38. Once the locking members 55 are retracted, the handle 35 is free to rotate about pin 42. To return locking members 55 to a locked position, the cam 68 may be retracted, causing the raised portion 90 to force locking members 55 outward into engagement with lock holes 44, 46, 48. To automate this process, a spring 95 may be placed between cam 68 and the forward face 96 of handle 35. In this way, the user may simply release slider 86 after disengaging locking members 55, and allow the locking members 55 to snap into locking engagement with the lock holes 44, 46, 48. As the cam 68 moves rearwardly, the sloped surfaces 98 of cam 68 engage locking members 55 gradually forcing them outward until the slider 86 reaches its rear stop 100 (FIG. 4).

Figure 8:
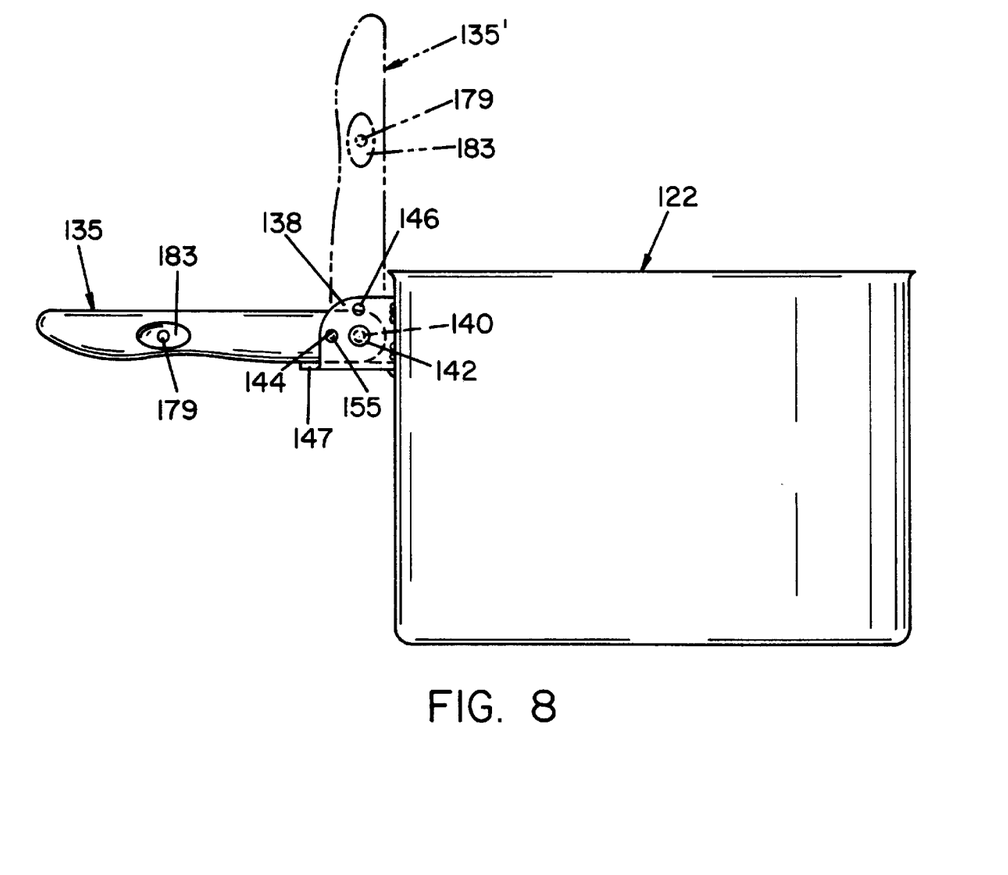
FIG. 8 is a side elevational view of an alternate embodiment of the handle assembly shown attached to a piece of cookware.
Figure 9:
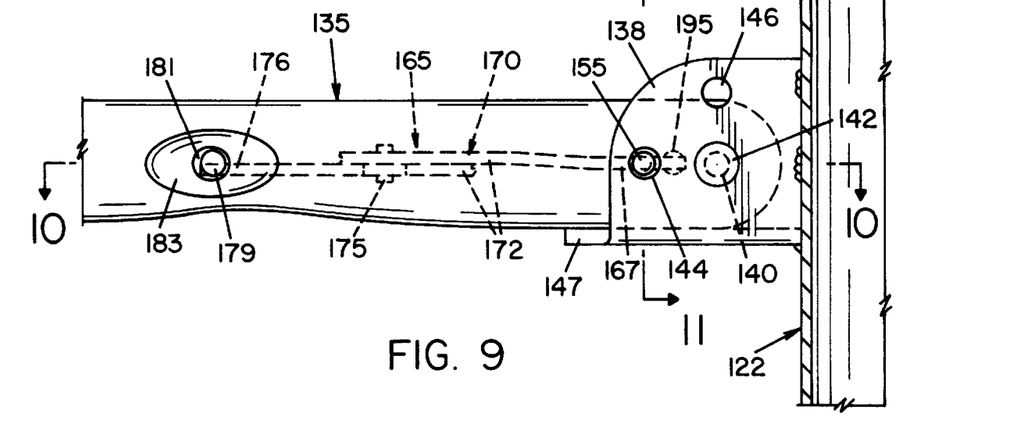
FIG. 9 is a fragmental side elevational view of an alternate embodiment of the handle assembly shown attached to a piece of cookware.

An alternate locking assembly embodiment, shown in FIG. 8, is a scissor-type locking assembly 165, which may be used to selectively lock a handle 135 similar to the above described handle 35, into a variety of positions. As shown in FIG. 8, the pivot hole 140 may be centrally located within arm members 138. Thus, pin 142 passes through a central portion of one end of handle 135. As before, lock holes are spaced circumferentially about pivot hole 140 and are radially equidistant therefrom. As shown in FIG. 8, handle 135 may be locked in a generally horizontal position or vertical position 135', using first and second lock holes 144 and 146 as described above. A vertical stop 147 may be provided to prevent downward rotation of the handle 135 beyond the horizontal position. As shown, vertical stop 147 is located below handle 135. In the alternative embodiment, locking members 155 extend from outwardly from one end 167 of a scissor member 170 and protrude through projection holes 158 formed within the handle 135. As in the first embodiment, the actuating interface is spaced rearwardly from the container 122, in this case by scissor member 170. Scissor member 170 generally includes a pair of arms 172 rotatably attached to each other at a pivot 175 and held in an X configuration. At the other end 176 of scissor member 170, a pair of buttons 179 extend radially outwardly from the ends of scissor member 170. It should be appreciated that buttons 179 and locking members 155 may be located at any point along the length of the scissor arms 172. As shown, buttons 179 and locking members 155 are located at the ends 167, 176 of the scissor member 170. These buttons 179 extend at least partially through button openings 181, which may be located on the sides 166 of handle 135. To prevent buttons 179 from protruding outside the sides 166, depressions 183 may be formed within sides 166 concentrically with and around the button openings 181. In this way, when buttons 179 are in a locked position (FIG. 10), they extend outwardly into depressions 183 but not beyond the sides 166. Beneficially, having the buttons 179 within sides 166 reduces the chance of the buttons 179 catching on the user's clothing. The user may then actuate buttons 179 by inserting his or her fingers into depressions 183 and inwardly pressing the buttons 179.

Figure 10:
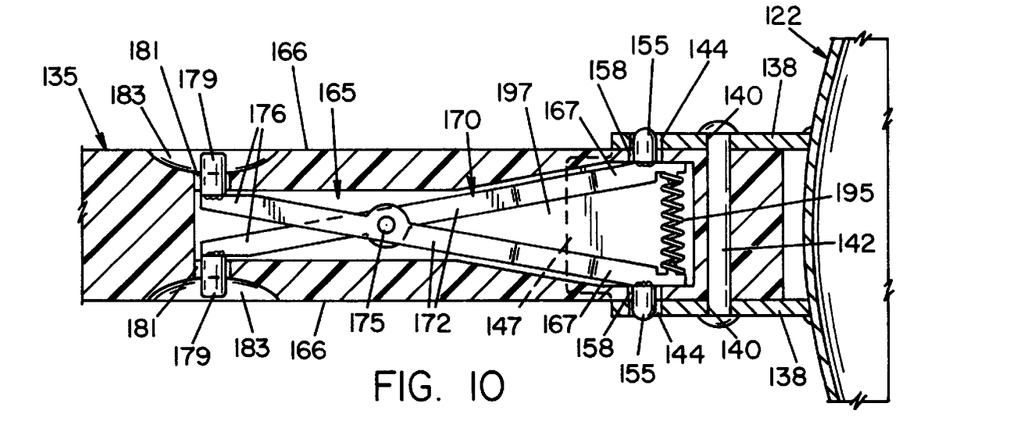
FIG. 10 is a fragmental top plan sectional view of an alternative embodiment as might be seen substantially along line 10—10 of FIG. 9 showing the locking assembly of the handle in a locked position.
Figure 11:
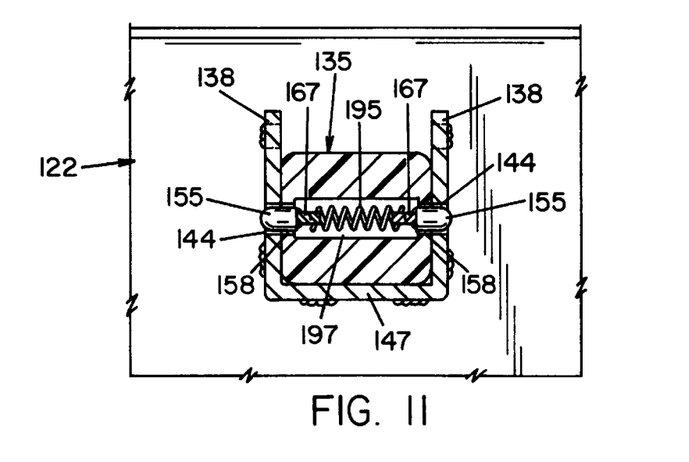
FIG. 11 is a fragmentary sectional view thereof taken substantially along line 11—11 in FIG. 9.
Figure 12:
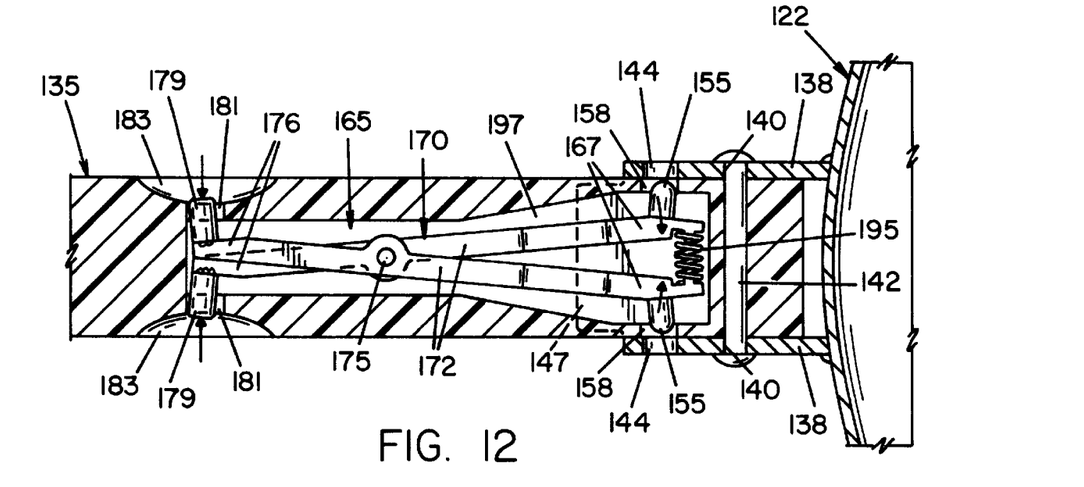
FIG. 12 is a fragmentary sectional view similar to FIG. 10 showing the alternative embodiment of the locking mechanism in an unlocked position.

A spring 195 may be placed between the ends of scissor arms 172 at either end of scissor member 170 to return the scissor member 170 to the locked position. As shown in FIG. 10, the spring 195 may be placed between arms 172 at the locking member end 167 of scissor member 170. The spring 195 forces the locking members 155 outward. When the locking members 155 are aligned with lock holes 144, 146 the spring member 195 forces the locking members 155 into lock holes 144, 146. To unlock the handle 135, the user may press inwardly on buttons 179, causing the scissor arms 172 to move inwardly and compress spring 195. Accordingly, locking members 155 move inwardly and disengage lock holes 144, 146 allowing handle 135 to rotate about pin 142. The unlocked position is best shown in FIG. 12.

In either embodiment, handle 135 may be provided with an axially-extending bore 197 sized to accommodate the locking assembly 165. In the alternative, a hollow handle 135 may be used.

Thus, it should be clear that the above-described invention fulfills the stated objectives. While only two embodiments of the present invention have been presented and described, it should be clear that many modifications could be made without escaping the spirit of this invention. Accordingly, for a true appreciation of the scope of this invention, reference should be made to the following claims.

What is claimed is:

1. A flip-handle for cookware, comprising:
    a mounting bracket attached to one side of the cookware;
        a handle vertically rotatably mounted to the mounting bracket; and
        a locking assembly selectively engaging said handle and said mounting bracket to prevent rotation of said handle with respect to said mounting bracket, wherein said mounting bracket includes a pair of spaced, vertical arm members;
        each of said arm members having a pivot hole and a plurality of radially spaced lock holes located radially equidistant from said pivot hole;
        a pin passing through said handle and said pivot hole; and wherein said locking assembly selectively engages at least one of said lock holes, whereby said handle may be selectively rotated between and locked in at least substantially horizontal and vertical positions.

2. A flip-handle for cookware according to claim 1, wherein said locking assembly is mounted on said handle and includes at least one locking member.

3. A flip-handle for cookware according to claim 1, wherein said locking assembly includes a pair of spring-loaded locking members.

4. A flip-handle for cookware according to claim 1, wherein said arm members have three lock holes.

5. A flip-handle for cookware according to claim 1, wherein said arm members have at least two lock holes;
    a first lock hole located below said pivot hole and substantially vertically aligned with said pivot hole; and
    a second lock hole located at an upper portion of said bracket and substantially horizontally aligned with said pivot hole.

6. A flip-handle for cookware according to claim 5, further comprising an intermediate lock hole located between said first and second lock holes and radially spaced from said pivot hole at the same distance as said first and second lock holes.

7. A flip-handle for cookware according to claim 6, wherein said intermediate lock hole is located at a point between said first and second lock holes such that when said handle is lockingly engaged with said intermediate lock hole, said handle is raised about 45 degrees relative to the horizontal plane.

8. A flip-handle for cookware according to claim 1, wherein said mounting bracket has vertically oriented arm members.

9. A flip-handle for cookware according to claim 8 further comprising a vertical stop attached to said arm members beneath said handle.

10. A flip-handle for cookware according to claim 1, wherein said mounting bracket includes a vertical member welded to the cookware.

11. A flip-handle for cookware according to claim 10 further comprising a vertical stop attached to the cookware and located beneath said handle.

12. A flip-handle for cookware according to claim 1, wherein said locking assembly includes
    a locking member housed within said handle and radially aligned with said lock holes;
    a cam member at least partially housed within said handle and in operative engagement with said locking member, such that said cam member selectively displaces said locking member between an unlocked position and a locked position.

13. A flip-handle for cookware according to claim 12 further comprising
    a slot formed within said handle wherein a distal end of said cam member extends at least partially into said slot, whereby the distal end of said cam member may be displaced within said slot causing said cam member to displace said locking member between said unlocked position and said locked position.

14. A flip-handle for cookware according to claim 13 further comprising
    a depression formed within said handle and surrounding said slot;
    a slider attached to said distal end of said cam member, wherein said slider rests within said depression.

15. A flip-handle for cookware according to claim 14, wherein said slider, said depression, said slot, and said distal end of said cam member are spaced from the cookware.

16. A flip-handle for cookware according to claim 12, wherein said handle has a front face and a wherein said locking assembly further includes a spring having a first end resting against said front face of said handle and a second end resting against said cam member, whereby said spring biases said cam member such that said cam member displaces said locking member into locking engagement with said lock holes.

17. A flip-handle for cookware according to claim 1, further comprising:
    a pair of projection holes, formed within said handle and a pair of button openings formed within said handle spaced rearwardly from said projection holes;
    a scissor member having a first end and a second end housed within said handle, wherein a pair of locking members extending outwardly from said scissor member near said first end and in alignment with said projection holes; and
    a pair of buttons extending outwardly from said scissor member near said second end and axially aligned with said button holes, wherein said buttons at least partially penetrate said button holes, whereby displacement of said buttons causes said locking members to move between a locked position and an unlocked position.

18. A flip-handle for cookware according to claim 17 further comprising a pair of depressions axially aligned with said button holes formed within said handle.

19. A flip-handle for cookware according to claim 17 further comprising:
    a spring located between at least one of said first and second ends of said scissor member.

20. A flip-handle for cookware according to claim 1, further comprising:
    an axial bore formed within said handle;
    a pair of projection holes formed within said handle extending laterally outwardly from said bore and a position corresponding with said lock holes;
    a pair of push-button holes formed within the sides of said handle and spaced rearwardly from said projection holes;

said push-button holes extending laterally outwardly from said bore;

an actuating assembly including a scissor member positioned within said bore having a first end adjacent said projection holes and a second end adjacent said push-button holes;

wherein said locking members extend outwardly from said first end and are axially aligned with said projection holes;

a pair of push buttons extending outward from said scissor member at said second end, said push buttons being axially aligned with said push button holes and at least partially projecting therethrough; and a spring member located between the arms of said scissor member at said first end.

21. A flip-handle for cookware according to claim 1, wherein said locking assembly includes a pair of spherical locking members housed within a pair of projection holes formed within the sides of said handle;

a cam housed within said handle;

said cam defining a pair of recesses for a least partially receiving said spherical locking members along the sides of said cam member;

a spring located within said handle between a forward wall of said handle and said cam;

a tab extending rearwardly from said cam;

a distal end of said tab penetrating a slot formed within said handle, such that when said distal end of said arm is advanced, said cam advances and said spherical locking members retract within said recesses, and when said distal end is released, said spring member displaces said cam rearwardly, causing said spherical projections to be forced outwardly into locking engagement with said mounting bracket.

* * * * *